US010282883B2

(12) United States Patent
Freeman (10) Patent No.: US 10,282,883 B2
(45) Date of Patent: May 7, 2019

(54) HIERARCHY-BASED CHARACTER RIGGING

(71) Applicant: Pixar, Emeryville, CA (US)

(72) Inventor: Seth Freeman, Emeryville, CA (US)

(73) Assignee: Pizar, Emeryville, CA (US)

( * ) Notice: Subject to any disclaimer, the term of this patent is extended or adjusted under 35 U.S.C. 154(b) by 284 days.

(21) Appl. No.: 14/569,216

(22) Filed: Dec. 12, 2014

(65) Prior Publication Data

US 2016/0171738 A1 Jun. 16, 2016

(51) Int. Cl.
*G06T 13/40* (2011.01)

(52) U.S. Cl.
CPC .................... *G06T 13/40* (2013.01)

(58) Field of Classification Search
None
See application file for complete search history.

(56) References Cited

U.S. PATENT DOCUMENTS

| 9,128,516 B1* | 9/2015 | Green | G06F 8/34 |
| 2008/0303829 A1* | 12/2008 | Fleury | G06T 13/40 345/473 |
| 2009/0132371 A1* | 5/2009 | Strietzel | G06Q 30/0247 705/14.46 |
| 2012/0019517 A1* | 1/2012 | Corazza | G06T 13/40 345/419 |
| 2014/0092090 A1* | 4/2014 | Fleury | G06T 15/503 345/420 |
| 2014/0267237 A1* | 9/2014 | McNerney | G06T 15/00 345/419 |
| 2015/0022516 A1* | 1/2015 | Jutan | G06T 13/40 345/419 |

OTHER PUBLICATIONS

Rhee, Taehyun et. al., Real-Time Weighted Pose-Space Deformation on the GPU Eurographics 2006, vol. 25 No. 3 pp. 439-448, 2006.*
Van Lommel, Brecht, Differential Methods in Character Rigging, Masterproef Informatica-Multimedia Universiteit Hassett 2007-2008.*

* cited by examiner

*Primary Examiner* — Jason A Pringle-Parker
(74) *Attorney, Agent, or Firm* — Patterson + Sheridan, LLP (57) ABSTRACT

Animated characters for a computer animated production are rigged via a rigging hierarchy. A character rigging system receives a first selection associated with a template character rig description. The character rigging system identifies a first root character rig description associated with the template character rig description, wherein the template character rig description inherits at least one attribute from the first root character rig description. The character rigging system creates an individual character rig description for the animated character based on the first root character rig description and the template character rig description.

13 Claims, 6 Drawing Sheets

HIERARCHY-BASED CHARACTER RIGGING

FIELD

The present disclosure relates to the field of computer animation and, in particular, to hierarchy-based character rigging.

BACKGROUND

Description of the Related Art

In computer animation, characters are typically created via a model which specifies the outward appearance of the character. Each model is then rigged via a time-intensive process by creating a skeleton associated with the model, positioning the skeleton, and weighting the points on the model to be deformed by the skeleton.

Animated scenes typically include multiple characters that interact with each other. In order to produce such scenes, each character in the scene is individually modeled and rigged. One potential drawback with this approach is that, because each character is individually rigged, the amount of time to rig characters increases linearly with the number of characters. Individual rigging is feasible and desirable for the principal characters in a particular animated production. However, the time required to individually rig characters for a crowd that includes dozens or hundreds of animated characters is typically much more than the available budget and production schedule allows.

SUMMARY

One embodiment of the present application includes a method for rigging an animatable character based on a hierarchy rigging model. The method includes receiving a first selection associated with a template character rig description. The method further includes identifying a first root character rig description associated with the template character rig description, wherein the template character rig description inherits at least one attribute from the first root character rig description. The method further includes creating an individual character rig description for the animated character based on the first root character rig description and the template character rig description.

Other embodiments include, without limitation, a computer-readable storage medium that includes instructions that enable a processing unit to implement one or more aspects of the disclosed methods as well as a computing system configured to implement one or more aspects of the disclosed methods.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As further described herein, animated characters are rigged via an animated character rigging hierarchy. The hierarchy is organized with a base rig at a top level that defines a base character, one or more intermediate levels of template rigs, and a bottom level of leaf rigs, also referred to herein as individual character rigs, that define the characteristics of an individual character. In one example, a character hierarchy could include at least three levels, where a first level includes a base rig, a second level includes template rigs, such as body and face rigs, and a third level includes individual character rigs. Typically, a given rig in the hierarchy inherits properties from rigs in a parent relationship to the given rig. For example, a second-level template rig would inherit properties from the first-level base rig. A third-level individual character rig would inherit properties from one or more second-level template rigs that are parents of the individual character rig. The third-level individual character rig would further inherit properties from the first-level base rig, because the first-level base rig is a parent rig to all rigs in the given hierarchy.

A new character may be rigged by choosing component rigs from the animated character rigging hierarchy. These component rigs include a base character rig, such as a human rig, and one or more template rigs for various character portions, such as a human thin body and a particular face. In other words, a base rig defines a broad category or type of character, such as a human, a horse, or a bird. However, in some embodiments, a base rig may define a non-living character, such as a chair a broom, or an imaginary character, such as a monster or a space alien. Template rigs include more detailed rigging information about a particular portion of a character specified the base rig. For example, template rigs in a hierarchy for a human base rig could include, without limitation, a body rig, a face rig, and a hand rig. In some embodiments, template rigs may have certain qualifiers as well. For example, body template rigs in a hierarchy for a human base rig could include, without limitation, an average body rig, a thin body rig, and a heavy body rig.

An individual character rig is then created and placed as a child rig of the one or more template rigs which are, in turn, child rigs of the base character rig. In this way, various individual characters are created by mixing and matching existing component rigs without the need to create a complete custom rigs for each individual character. Additional component rigs may be created and added to the rigging hierarchy to add, for example, new body template rigs or face template rigs. Thus new characters may be created by selecting from among existing component rigs and, optionally, adding new component rigs rather than designing a new character rig from scratch. A character's rig defines direction and extent of possible motion, as well as constraints on motion. Once the new characters are rigged, a simulation is also associated with each rigged character that defines how the rigged model moves. The character is then animated by applying a motion simulation to the character rig and calculating the resulting motion of the model based on the motion of the rigged character. The model is then rendered to produce the final moving image of the character.

In the following description, numerous specific details are set forth to provide a more thorough understanding of the present disclosure. However, it will be apparent to one of skill in the art that the present disclosure may be practiced without one or more of these specific details.

Hardware Overview

Figure 1:
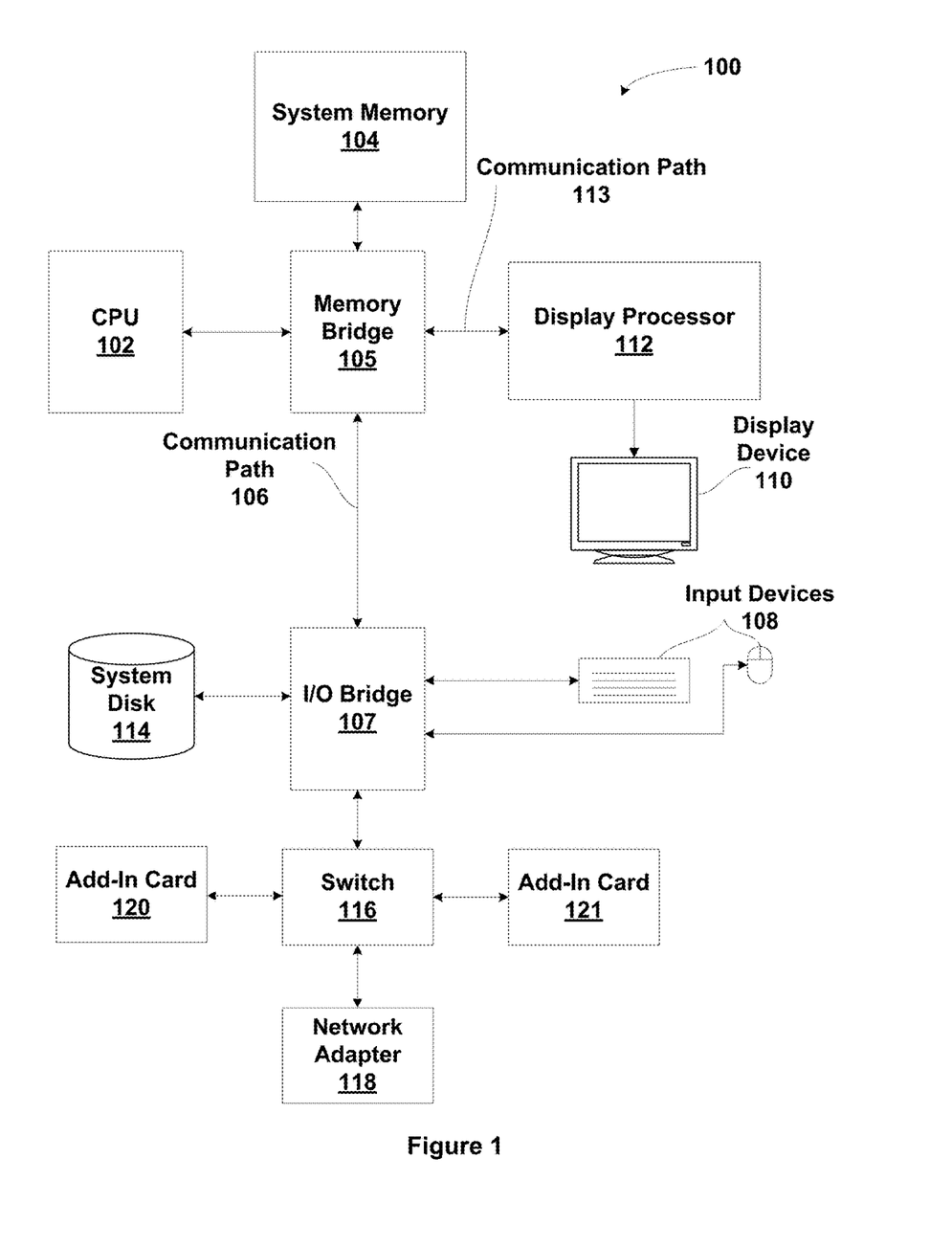
FIG. 1 depicts one architecture of a system within which embodiments of the present disclosure may be implemented.

FIG. 1 depicts one architecture of a system 100 within which embodiments of the present disclosure may be implemented. This figure in no way limits or is intended to limit the scope of the present disclosure. System 100 may be a personal computer, video game console, personal digital assistant, rendering engine, or any other device suitable for practicing one or more embodiments of the present disclosure.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, BLU-RAY™, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Hierarchy-Based Character Rigging

Figure 2:
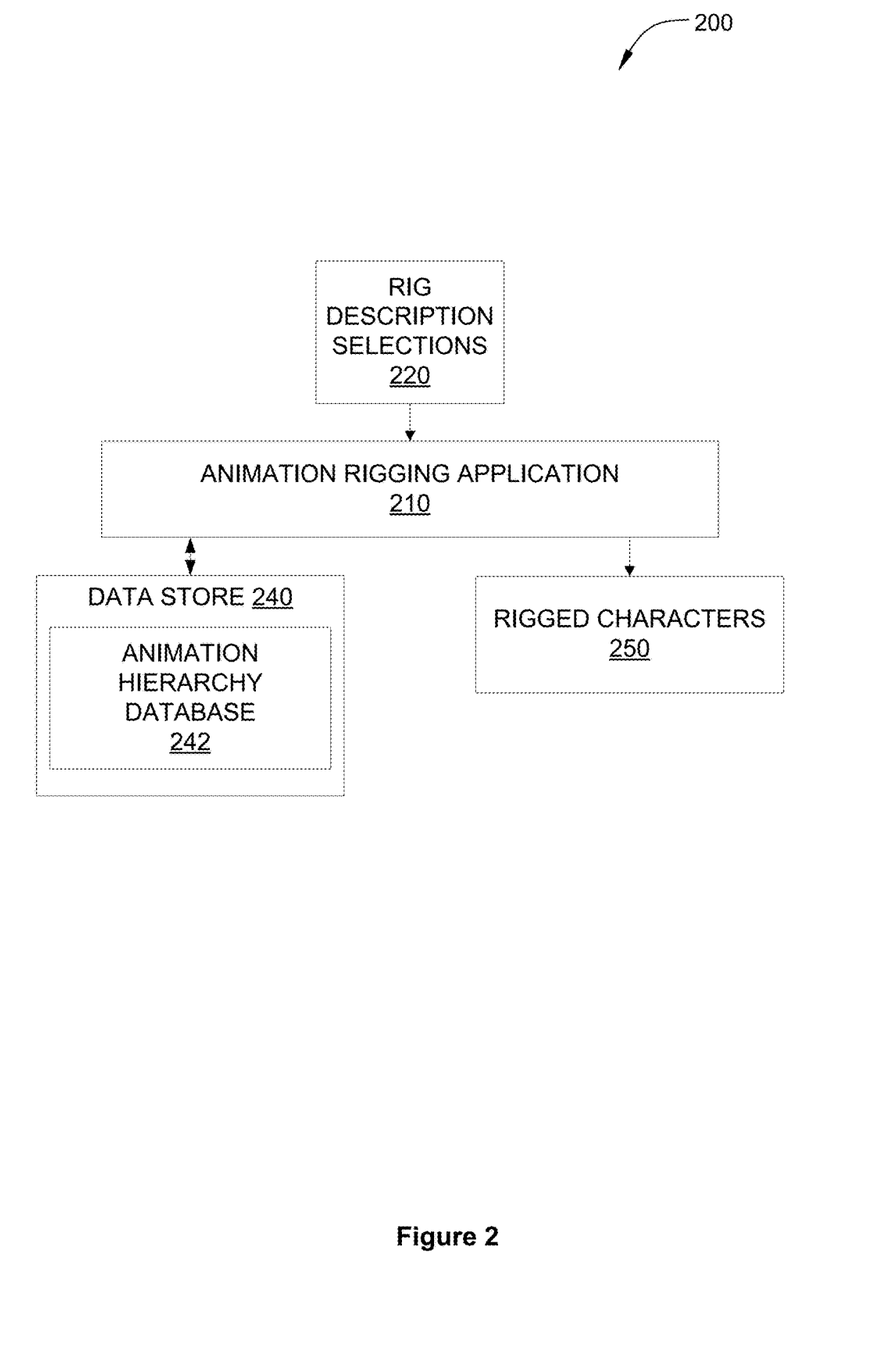
FIG. 2 is a block diagram of an animation rigging system, according to one embodiment.

FIG. 2 is a block diagram of an animation rigging system 200, according to one embodiment. In one embodiment, the animation rigging system 200 may implement the computer system 100 of FIG. 1. As further described herein, the animation rigging system 200 creates new character rigs by combining existing component rigs selected by a user or another software application program. The component rigs include one or more of a root rig, template rigs, and individual character rigs. As shown, the animation rigging system 200 includes an animation rigging application 210, rig description selections 220, a data store 240, and rigged characters 250. The data store 240, in turn, includes an animation hierarchy database 242.

The animation rigging application 210 is a software program or group of programs executing on the animation rigging system 200 that facilitates modeling, rigging, rendering, and simulating animated characters via an animated character rigging hierarchy. The animation rigging application 210 receives rig description selections 220. For example, for a human-like character, the description selections 220 could include a root character, a character body type, a character face type, and an individual character. The animation rigging application 210 retrieves an animated character rigging hierarchy from the animation hierarchy database 242 corresponding to the selected root character. The animation rigging application 210 applies parameters and data corresponding to the selected character body type, character face type, and individual character, as specified by the animated character rigging hierarchy and generates one or more rigged characters 250.

Figure 3:
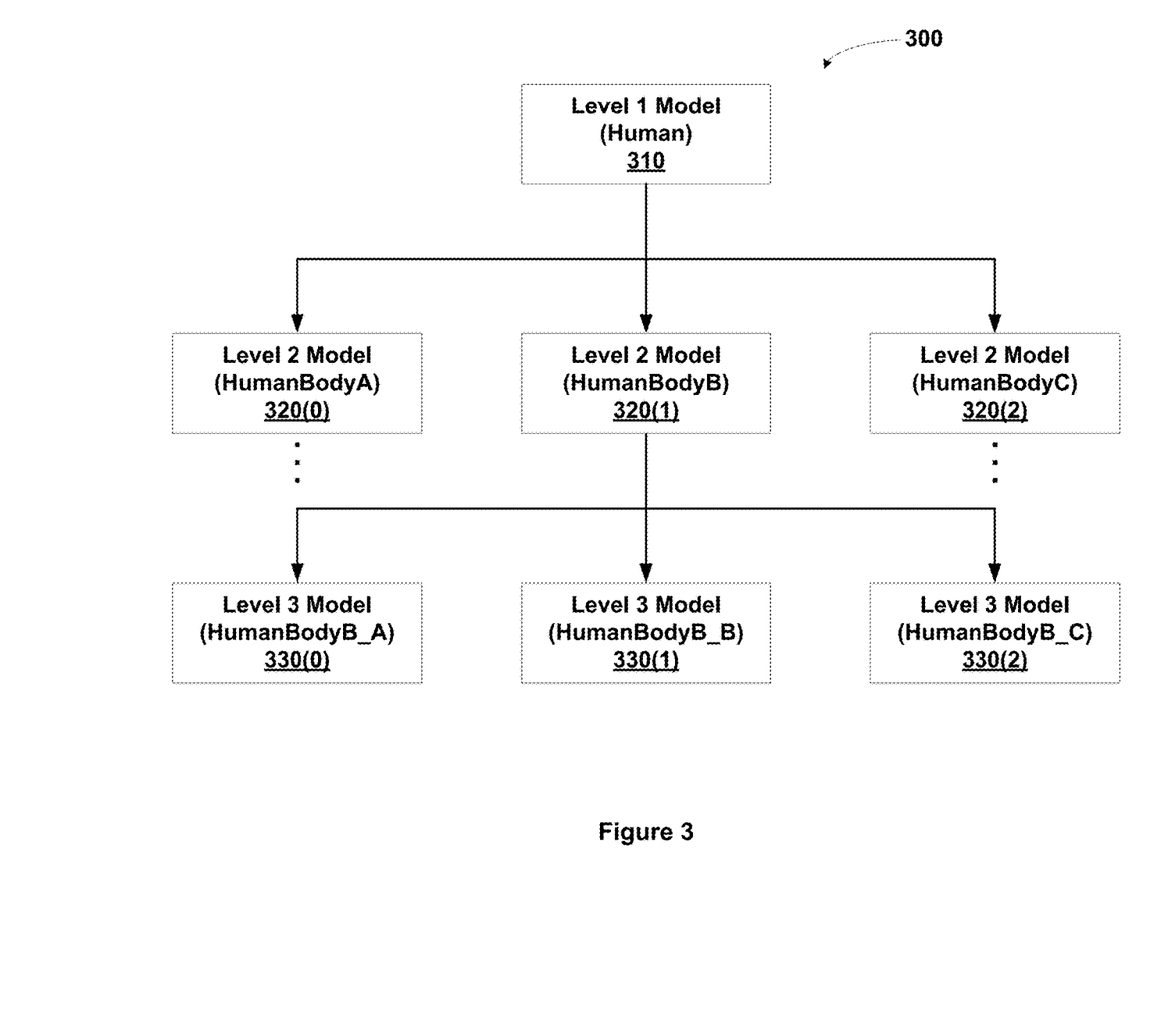
FIG. 3 illustrates an animated character rigging hierarchy, according to one embodiment.

FIG. 3 illustrates an animated character rigging hierarchy 300, according to one embodiment. As shown, the animated character rigging hierarchy 300 includes a level 1 model 310, level 2 models 320, and level 3 models 330. For example, the level 1 model 310 could specify a basic human rig, level 2 models 320 could specify various body types, including, without limitation, average, thin, and heavy bodies, and level 3 models 330 could specify individual characters. Although FIG. 3 shows 3 levels, the animated character rigging hierarchy 300 may have any suitable number of levels to model a particular class of character. The level 1 model 310 includes a model for an archetypal human. The level 2 models 320 include a human body A level 2 model 320(0), a human body B level 2 model 320(1), and a human body C model 320(2). In addition, the animated character rigging hierarchy 300 may include additional level 2 models 320 (not explicitly shown). Each of the level 2 models 320 is the child of the level 1 model 310 and the parent of one or more level 3 models. Illustratively, the animated character rigging hierarchy 300 includes three level 3 models 330. The parent for these three level 3 models 330 is the human body B level 2 model 320(1). The level 3 models 330 include a human body B_A level 3 model 330(0), a human body B_B level 3 model 330(1), and a human body B_C level 3 model 330(2).

Figure 4:
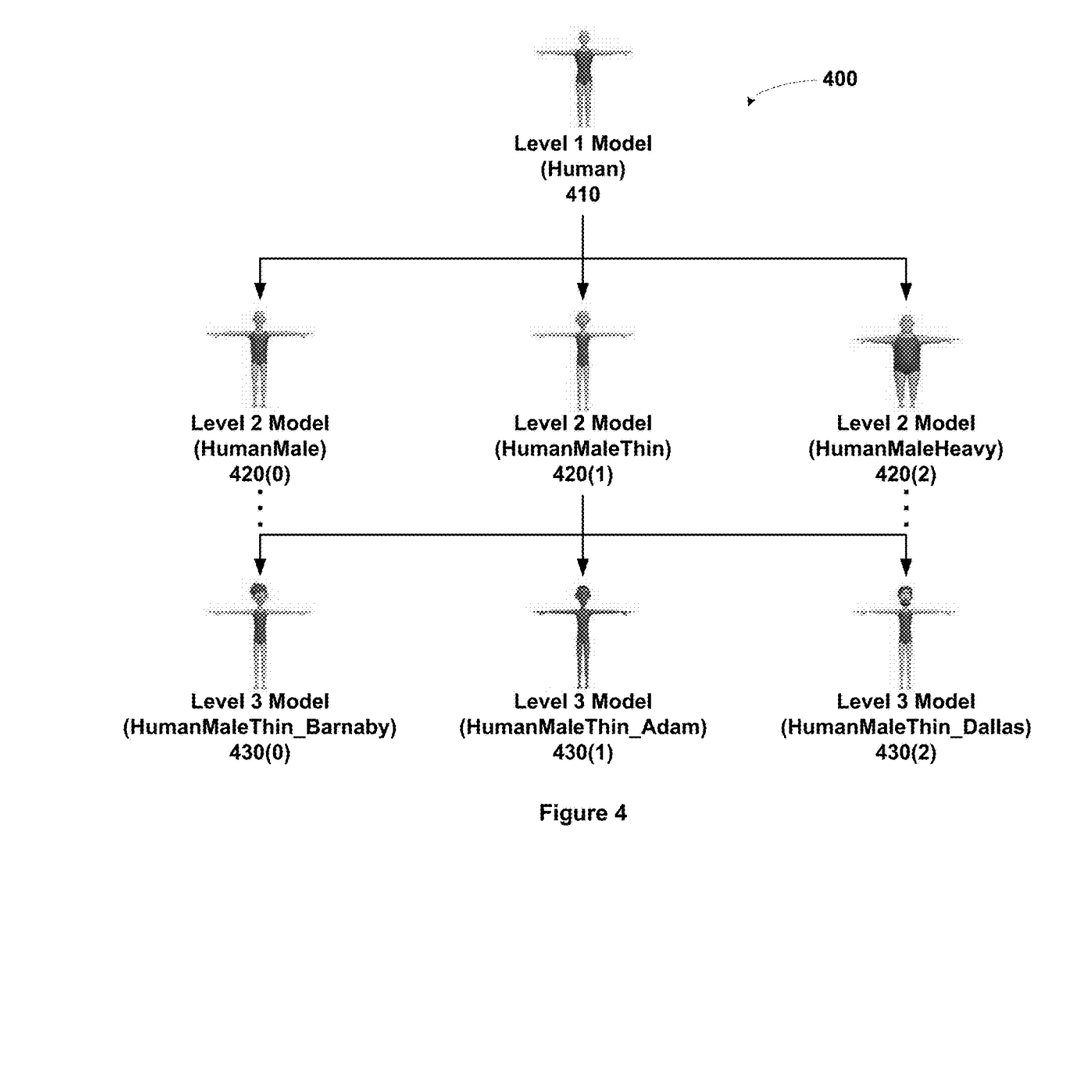
FIG. 4 illustrates an animated character rigging hierarchy, according to another embodiment.

FIG. 4 illustrates an animated character rigging hierarchy 400, according to another embodiment. As shown, the animated character rigging hierarchy 400 includes a level 1 model 410, level 2 models 420, and level 3 models 430. The animated character rigging hierarchy 400 functions substantially the same as the animated character rigging hierarchy 300, except as described below.

The animated character rigging hierarchy 400 includes a human level 1 model 410 which, in turn, includes three level 2 models 420. The three level 2 models include a human male level 2 model 420(0), a human male thin level 2 model 420(1), and a human male level 2 heavy model 420(2). The human male thin level 2 model 420(1), in turn, includes three level 3 models 430, including a human male thin Barnaby level 3 model 430(0), a human male thin Adam level 3 model 430(1), and a human male thin Dallas level 3 model 430(2).

Additional character rigging hierarchies (not explicitly shown) may provide rigging descriptions for non-human characters, including, without limitation, other living creatures, such as dogs, horses, or bears, non-living creatures, such as chairs or broomsticks, or fictional creatures, such as aliens or monsters.

Figure 5:
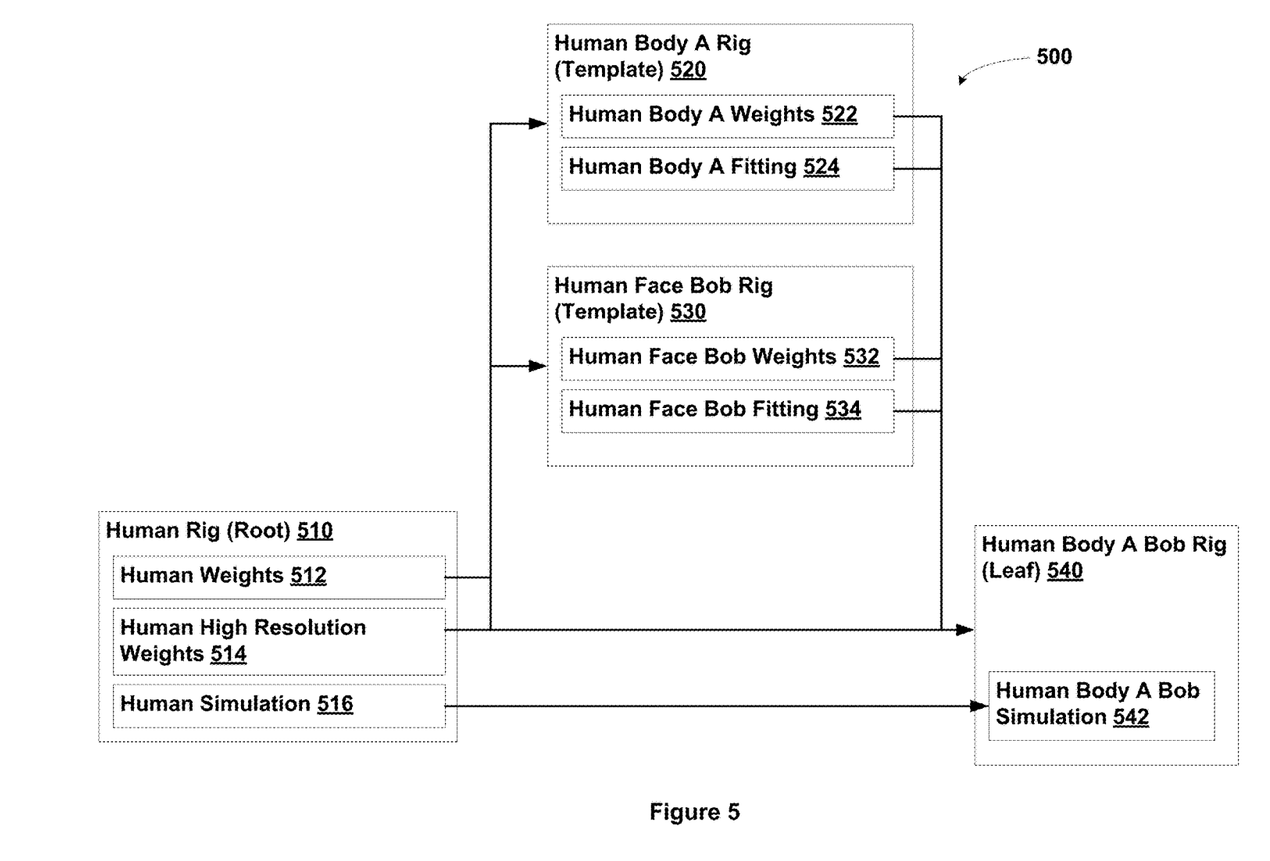
FIG. 5 illustrates a node inheritance model associated with an animated character rigging hierarchy, according to one embodiment.

FIG. 5 illustrates a node inheritance model 500 associated with an animated character rigging hierarchy, according to one embodiment. As shown, the node inheritance model 500 includes human rig 510, a human body A rig 520, a human face Bob rig 530, and a human body A Bob rig 540. As described herein, nodes may include model nodes that layer over each other via inheritance, where nodes at a given level inherit from immediate and higher level parent nodes. For example, level 3 models 430(0), 430(1), and 430(2) inherit from level 2 model 420(1), which, in turn, inherits from level 1 model 410.

The human rig 510 is a level 1 root rig for a prototypical human. In this example, the human rig 510 would serves as an ancestor of all humans with a specific topology. In some embodiments, additional level 1 root rigs may exist for non-human animated characters. The human rig 510 includes human weights 512, human high resolution weights 514, and human simulation 516. The human weights 512 includes base vertex weighting for the face and body of the human rig 510. Typically, the human weights 512 are calculated for a low resolution model, referred to herein as a rigging mesh. The human weights 512 control the basic coarse level rigging and movement of the animated character. That is, the human weights 512 define how major joints or vertices of an animated character move. For example, coarse level weights associated a given rigging mesh could specify how the character generally moves when the character is walking, dancing, jumping or crawling. The human high resolution weights 514 include base vertex high resolution weighting for the face and body of the human rig 510. Typically, the human high resolution weights 514 are calculated for a high resolution model referred to herein as a render mesh. The human high resolution weights 514 control the basic fine detail level rigging of the animated character. That is, the human weights 512 define how higher resolution regions of an animated character move. For example, fine level weights associated a given render mesh could specify how the wrinkles on an older character's face move when the character is smiling, frowning, or laughing. In some embodiments, the human high resolution weights 514 primarily include selectable vertices for animation control as well as collision data. In general, the human rig 510 does not include digital sculpting (vector weights) data. Rather, the human rig 510 includes only scalar weights associated with one or both of the human weights 512 and the human high resolution weights 514. In one embodiment, these scalar weights may represent control coefficients, color, 3D position or other data as defined for each vertex of the rigging mesh. The sculpted surface may then be created based in part on the scalar weights. The sculpted surface may later be modified by changing the values of the scalar weights. The human simulation 516 includes parameters that describe how the human rig 510 behaves with simulated objects such as garments and hair.

The human body A rig 520 is a level 2 template rig for a human with a body type identified as body type 'A'. The human body A rig 520 defines a template for a prototypical body type for each animated characters sharing the 'A' body type. In some embodiments, additional level 2 template rigs may exist for other human body types. The human body A rig 520 includes human body A weights 522 and human body A fitting 524. The human body A weights 522 include weights and digital sculpting data that specify a shape for animated characters having the 'A' body type. In some embodiments, the human body A rig 520 inherits weight data from the human weights 512 and the human high resolution weights 514 of the human rig 510.

In one embodiment, the weights included in the human body A weights 522, the human weights 512, and the human high resolution weights 514 may be bone weights that define the amount of influence each bone in the rig has on adjacent vertices when the rig is animated. The human body A rig 520 may inherit all the weights included in the human weights 512 and the human high resolution weights 514 of the human rig 510. Alternatively, the human body A rig 520 may inherit a portion of the weights included in the human weights 512 and the human high resolution weights 514. The portion of the weights that are inherited may be determined via any technically feasible approach, including, without limitation, user settings, default rules, or by specifying each weight as to whether the weight is inheritable or not inheritable. If a particular weight appears in two or more of human weights 512, human high resolution weights 514, and the human body A weights 522, the final weight may be determined via a specified priority system. For example, a weight that appears in the human body A weights 522 could take precedence over a weight that appears in the human high resolution weights 514 which, in turn, could take precedence over a weight that appears in the human weights 512.

The human body A fitting 524 includes fitting data, such as "bone" positions and various configuration values, for attaching the human body A rig 520 to a model for a particular animated character.

The human face Bob rig 530 is a level 2 template rig for a human with a face type of "Bob". The human face Bob rig 530 defines a template for a prototypical face for animated characters based on the "Bob" face type. The human face Bob rig 530 includes human face Bob weights 532 and human face Bob fitting 534. The human face Bob weights 532 include weights for the human face Bob rig 530 template. The human face Bob weights 532 also include digital sculpting data that give specific shape to animated characters based on the "Bob" body type. In some embodiments, the human face Bob rig 530 inherits weight data from the human weights 512 and the human high resolution weights 514 of the human rig 510. The human face Bob fitting 534 includes fitting data, such as "bone" positions and various configuration values, for attaching the human face Bob rig 520 to a model for a particular animated character.

The human body A Bob rig 540 is a level 3 leaf rig for an individual human character with a body type of 'A' and a face type of "Bob". The human body A Bob rig 540 includes specific rigging for the corresponding individual character. The human body A Bob rig 540 also includes human body A Bob simulation 542. The human body A Bob simulation 542 includes simulation data and other simulation options associated with the corresponding individual character. In some embodiments, the human body A Bob rig 540 inherits weight data from the human weights 512 and the human high resolution weights 514 of the human rig 510. In some embodiments, the human body A Bob rig 540 also inherits human body A weights 522 and human body A fitting 524 from the human body A rig 520 and human face Bob weights 532 and human face Bob fitting 534 from the human face Bob B rig 530. In some embodiments, the human body A Bob rig 540 also inherits human simulation 516 data from the human rig 510.

Although the exemplary model shown in FIG. 5 includes a body template, exemplified by human body A rig 520, and a face template, exemplified by human face Bob rig 530, various embodiments may include a combined face/body template. Alternatively, various embodiments may include only one of a body or a face template, or additional templates other than a body and a face template.

With animated character rigging hierarchies, such as animated character rigging hierarchy 300 and animated character rigging hierarchy 400, rigging, rendering, and simulations are accomplished via inheritance of fitting, weights, and simulation data via the hierarchy. The creation of rigs for multiple individualized characters is facilitated without the need to create customized rigs for each animated character. For example, by using animated character rigging hierarchies, a new thin human character named Bob could be created by selecting a human base rig, a human thin male template rig, and a "Bob" face rig. Similarly, a new thin human character named Dallas could be created by selecting the same human base rig, the same, or an alternative, human thin male template rig, and a "Dallas" face rig. A heavy version of the character Bob could be created by selecting the human base rig, a human heavy male template rig, and the "Bob" face rig, and so on. If two new character rig are created from exactly the same component rigs, then the two characters would be the same as well. That is, if two new character rigs are created by selecting the human base rig, the human thin male template rig, and an "Adam" face rig, then the two characters would appear to be a thin male named Adam and Adam's identical twin. By using a rigging hierarchy, sufficiently populated with component template rigs and individual character rigs, a crowd of fifty or one hundred individual characters could be created in a fraction of the time needed to create fifty or one hundred custom individualized rigs from scratch.

In some embodiments, a rig may be collapsed to any node in the rigging hierarchy, e.g., a level 1 root node, a level 2 template node, and a level 3 leaf node. By collapsing a rig to a particular node, the collapsed node may be severed from the hierarchy. The collapsed node may then serve as a root node in a new hierarchy. Collapsing a node may be beneficial when an individual character in a hierarchy is selected to be used as a principal character in a computer animation. Collapsing a node may also be beneficial when an individual character in a hierarchy serves as a common ancestor, or root rig, for a number of other characters with the same topology. To collapse to a selected node, each sublayer for the collapsed node and all corresponding higher level nodes are copied to a temporary rigging file. A new character rigging class is then created for the collapsed node. All sublayers copied in the temporary rigging file, including all fitting, weights, simulation, and sculpting data, are then copied to the new character rigging class. The new character rigging class is then used as a root for a new hierarchy. In alternative embodiments, certain individual sublayers may be selected for copying to the new character rigging class rather than copying all sublayers. In this embodiment, rigging mesh data may be copied to the new rigging class and certain edits to the render mesh. The render mesh may then be edited to add certain additional details, such as wrinkles.

The hierarchical structure described herein provides for a variety of operations. In one example, to diverge from a particular animated character rigging hierarchy, a copy of the hierarchy could be made to form a new animated character rigging hierarchy. New leaves could be created for the new animated character rigging hierarchy without disturbing the original animated character rigging hierarchy. In another example, a sub-tree could be created from an existing animated character rigging hierarchy, where render information for the new render mesh is stored locally in the sub-tree. In one embodiment, if a value or weight changes in a particular node at a particular level of the hierarchy, then the changed value or weight may propagate to all child nodes of the particular node up to and including all leaf nodes below the particular node. In an alternative embodiment, if a value or weight changes in a particular node at a particular level of the hierarchy, then the changed value or weight may propagate only to new nodes created in the hierarchy under the particular node.

In one embodiment, the animation rigging system 200 builds a rig for a specific character form the top down by starting with rig information from the root rig, such as the human rig 510. The animation rigging system 200 then integrates data from one or more second level rigs, such as the human body A rig 520 and the human face Bob rig 530, as well as other intervening intermediate level rigs, as needed. Finally, the animation rigging system 200 integrates data from the lowest level leaf rig, such as the human body A Bob rig 540.

In another embodiment, the animation rigging system 200 builds a rig for a specific character form the bottom up by starting with rig information from the lowest level leaf rig, such as the human body A Bob rig 540. The animation rigging system 200 then integrates data from one or more second level rigs, such as the human body A rig 520 and the human face Bob rig 530, as well as other intervening intermediate level rigs, as needed. Finally, the animation rigging system 200 integrates data from the root rig, such as the human rig 510.

Figure 6:
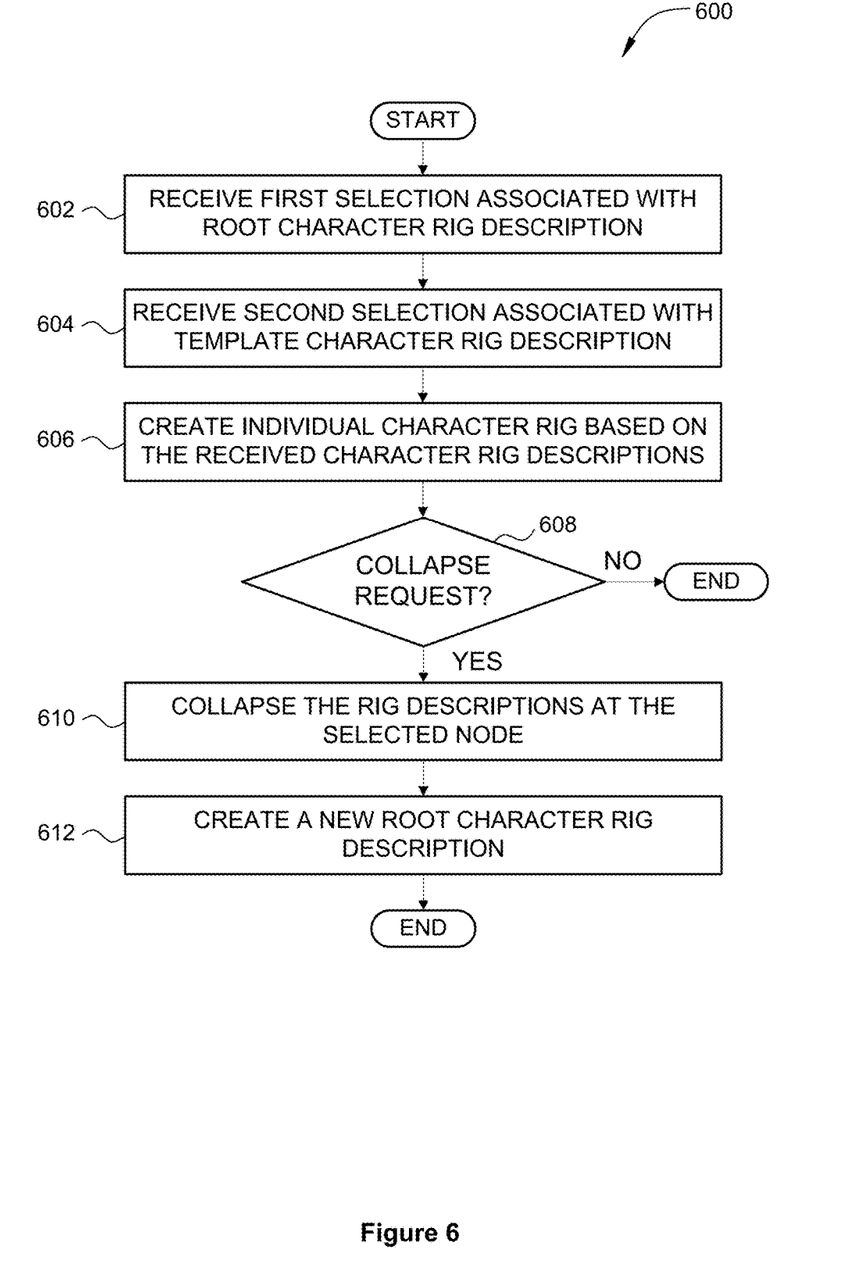
FIG. 6 sets forth a flow diagram of method steps for rigging animated characters via a character rigging hierarchy, according to one embodiment.

FIG. 6 sets forth a flow diagram of method steps for rigging animated characters via a character rigging hierarchy, according to one embodiment. Although the method steps are described in conjunction with the systems of FIGS. 1-5, persons of ordinary skill in the art will understand that any system configured to perform the method steps, in any order, is within the scope of the present disclosure.

As shown, a method 600 begins at step 602, where the animation rigging system 200 receives a first selection associated with a first root character rig description related to a specific topology. At step 604, the animation rigging system 200 receives a second selection associated with a template character rig description. In some embodiments, the template character rig description may inherit at least one attribute from the first root character rig description. In some embodiments, the root character rig may not be explicitly selected. In these embodiments, the animation rigging system 200 identifies the root character rig description associated with the first root character rig description. Any needed attributes from the first root character rig description are then integrated into the template character rig description via inheritance. At step 606, the animation rigging system 200 creates an individual character rig description for the animated character based on the first root character rig description and the template character rig description. The individual character rig description may inherit at least one attribute from each of the first root character rig description and the template character rig description. At step 608, the animation rigging system 200 determines whether a collapse request has been received. If a collapse request has not been received, then the method 600 terminates.

If, at step 608, a collapse request has been received, then the method proceeds to step 610, where the animation rigging system 200 collapses to the selected node. At step 612, the animation rigging system 200 creates a second root character rig description, where the second root character rig description includes one or more of vector weights, scalar weights, simulation parameters, and fitting data based on one or more layers of the selected node and all other nodes with a parent relationship to the selected node in the rigging hierarchy. The method 600 then terminates.

In sum, animated characters are rigged via an animated character rigging hierarchy. An animation rigging application receives one or more rig description selections, including, for example, a root character, a character body type, a character face type, and an individual character. The animation rigging application retrieves an animated character rigging hierarchy from the animation hierarchy database corresponding to the selected root character. The animation rigging application applies parameters and data corresponding to the selected character body type, character face type, and individual character, as specified by the animated character rigging hierarchy and generated one or more rigged characters. A character's rig defines direction and extent of possible motion, as well as constraints on motion. Once the new characters are rigged, a simulation is also associated with each rigged character that defines how the rigged model moves. The character is then animated by applying a motion simulation to the character rig and calculating the resulting motion of the model based on the motion of the rigged character. The model is then rendered to produce the final moving image of the character. The final moving characters are placed into an animated (or live) scene that includes background, such as grass, hills, and sky, and other objects, such as trees and buildings, to form the final automated scene.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method of rigging an animated character via a character rigging hierarchy, the method comprising:
   receiving a first selection associated with a template character rig description;
   identifying a first root character rig description associated with the template character rig description, wherein the first root character rig description includes simulation parameters related to the animated character, wherein the template character rig description includes a plurality of vector and scalar weights related to the animated character, wherein the template character rig description inherits at least one rigging attribute from the first root character rig description, wherein the first root character rig description specifies a first rigging attribute that defines one or more character movement constraints associated with the first root character rig description, and wherein the template character rig description specifies a second rigging attribute that defines one or more character movement constraints associated with the template character rig description; and
   creating an individual character rig description for the animated character, wherein the individual character rig description inherits the first rigging attribute directly from the first root character rig description and the second rigging attribute directly from the template character rig description, wherein the first rigging attribute is different from the second rigging attribute, and wherein the individual character rig description defines at least one of (i) a direction of possible motion, (ii) an extent of possible motion, and (iii) one or more motion constraints, for the animated character.

2. The method of claim 1, further comprising associating the individual character rig description with a model of the animated character.

3. The method of claim 1, wherein the first rigging attribute specified by the first root character rig description corresponds to a rigging mesh, and wherein the second rigging attribute specified by the template character rig description corresponds to a render mesh.

4. The method of claim 1, wherein the template character rig description includes fitting data that defines how the individual character rig attaches to the animated character.

5. The method of claim 1, wherein the one or more character movement constraints associated with the template character rig description relate to a body of the animated character, and wherein the template character rig description further includes a second one or more character movement constraints that relate to a face of the animated character.

6. The method of claim 1, further comprising:
   collapsing the first root character rig description, the template character rig description, and the individual character rig description; and
   creating a second root character rig description, wherein the second root character rig description includes vector and scalar weights, simulation parameters, and fitting data from one or more of the first root character rig description, the template character rig description, and the individual character rig description.

7. The method of claim 1, wherein the first root character rig description includes a first set of vector and scalar weights configured to control the animated character at a first resolution and a second set of vector and scalar weights configured to control the animated character at a second resolution, and wherein the template character rig description inherits one or more weights from the first root character rig description by:
   determining a priority between the first and the second set of vector and scalar weights; and
   inheriting the one or more weights from one of the first and the second set of vector and scalar weights based on the priority.

8. A non-transitory computer-readable storage medium including instructions that, when executed by a processing unit, cause the processing unit to rig an animated character via a character rigging hierarchy, by performing the steps of:
   receiving a first selection associated with a template character rig description;
   identifying a first root character rig description associated with the template character rig description, wherein the first root character rig description includes simulation parameters related to the animated character, wherein the template character rig description includes a plurality of vector and scalar weights related to the animated character, wherein the template character rig description inherits at least one rigging attribute from the first root character rig description, wherein the first root character rig description specifies a first rigging attribute that defines one or more character movement constraints associated with the first root character rig description, and wherein the template character rig description specifies a second rigging attribute that defines one or more character movement constraints associated with the template character rig description; and
   creating an individual character rig description for the animated character, wherein the individual character rig description inherits the first rigging attribute directly from the first root character rig description and the second rigging attribute directly from the template character rig description, wherein the first rigging attribute is different from the second rigging attribute, and wherein the individual character rig description defines at least one of (i) a direction of possible motion, (ii) an extent of possible motion, and (iii) one or more motion constraints, for the animated character.

9. The computer-readable storage medium of claim 8, further comprising associating the individual character rig description with a model of the animated character.

10. The computer-readable storage medium of claim 8, wherein the first root character rig description includes a plurality of vector and scalar weights related to the animated character.

11. The computer-readable storage medium of claim 10, wherein the plurality of vector and scalar weights includes a first set of vector and scalar weights at a first resolution and a second set of vector and scalar weights at a second resolution.

12. The computer-readable storage medium of claim 11, wherein the first set of vector and scalar weights corresponds to a rigging mesh and the second set of vector and scalar weights corresponds to a render mesh.

13. A computing system, comprising:
   a memory that is configured to store instructions for a program; and
   a processor that is configured to execute the instructions for the program to rig an animated character via a character rigging hierarchy, by performing an operation comprising:
   receiving a first selection associated with a template character rig description;
   identifying a first root character rig description associated with the template character rig description, wherein the first root character rig description includes simulation parameters related to the animated character, wherein the template character rig description includes a plurality of vector and scalar weights related to the animated character, wherein the template character rig description inherits at least one rigging attribute from the first root character rig description, wherein the first root character rig description specifies a first rigging attribute that defines one or more character movement constraints associated with the first root character rig description, and wherein the template character rig description specifies a second rigging attribute that defines one or more character movement constraints associated with the template character rig description; and
   creating an individual character rig description for the animated character, wherein the individual character rig description inherits the first rigging attribute directly from the first root character rig description and the second rigging attribute directly from the template character rig description, wherein the first rigging attribute is different from the second rigging attribute, and wherein the individual character rig description defines at least one of (i) a direction of possible motion, (ii) an extent of possible motion, and (iii) one or more motion constraints, for the animated character.

* * * * *

UNITED STATES PATENT AND TRADEMARK OFFICE
CERTIFICATE OF CORRECTION

PATENT NO. : 10,282,883 B2  
APPLICATION NO. : 14/569216  
DATED : May 7, 2019  
INVENTOR(S) : Seth Freeman Page 1 of 1

It is certified that error appears in the above-identified patent and that said Letters Patent is hereby corrected as shown below:

On the Title Page

In item (73), in Column 1, in "Assignee", Line 1, delete "Pizar," and insert -- Pixar, --, therefor.

In item (56), in Column 2, under "Other Publications", Line 5, delete "Hassett" and insert -- Hasselt --, therefor.

Signed and Sealed this  
Third Day of September, 2019

Andrei Iancu  
*Director of the United States Patent and Trademark Office*